Nov. 29, 1955  F. P. BENNETT  2,724,990
FILM STRIP PROJECTOR
Filed May 15, 1952  6 Sheets-Sheet 1
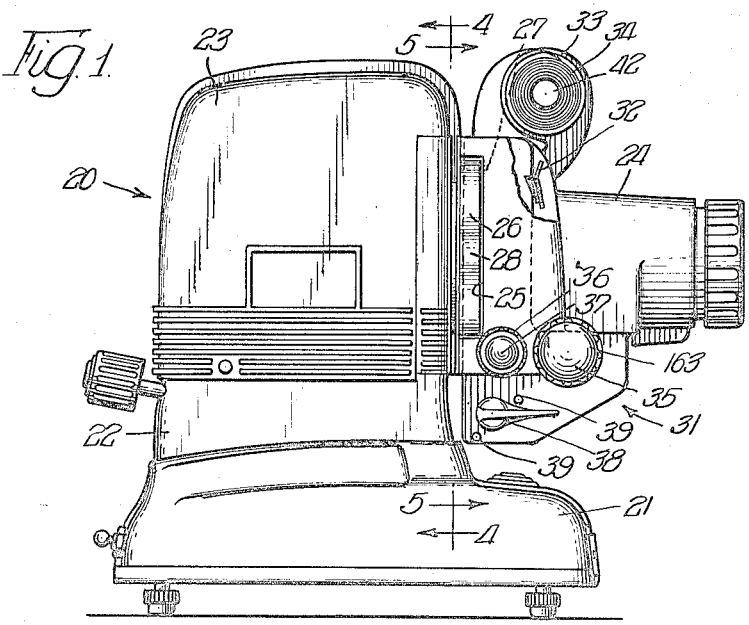
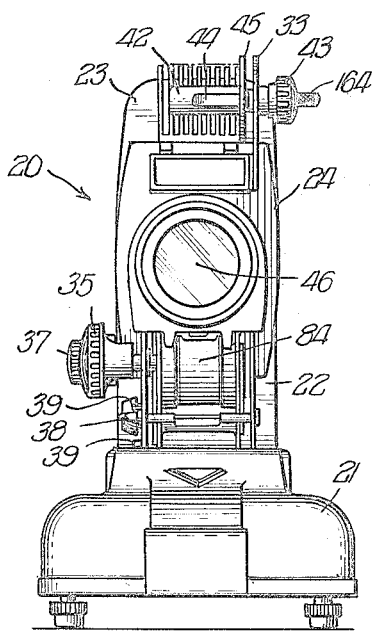
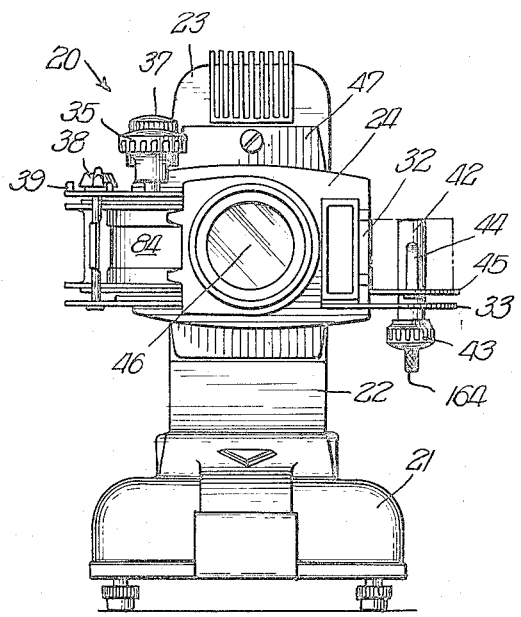
INVENTOR.
Frank P. Bennett,
BY Robert R. Lockwood
atty.

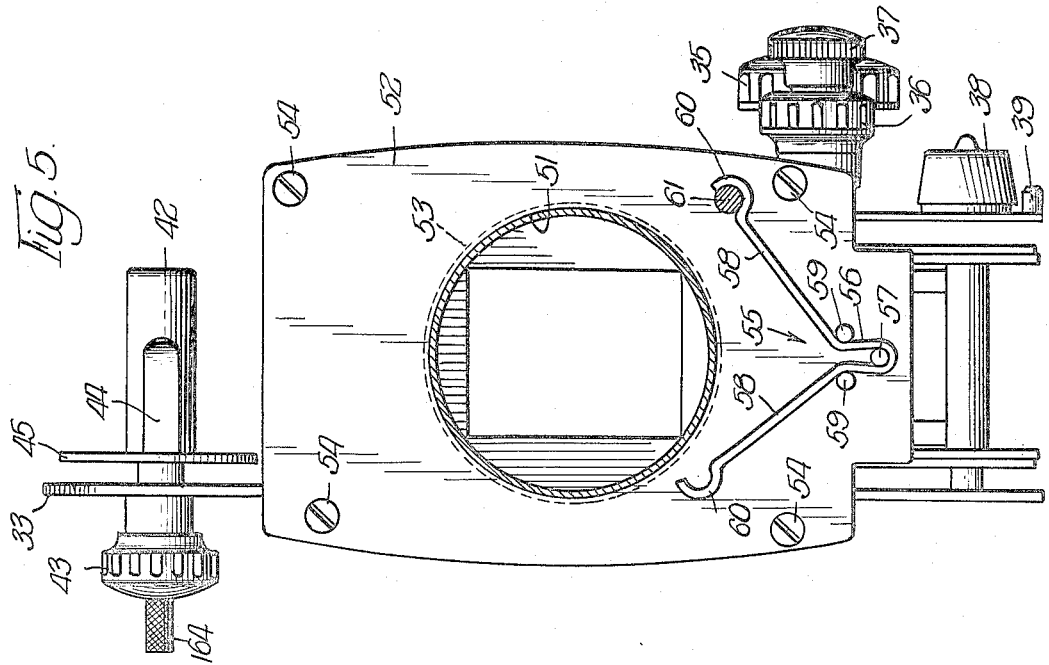

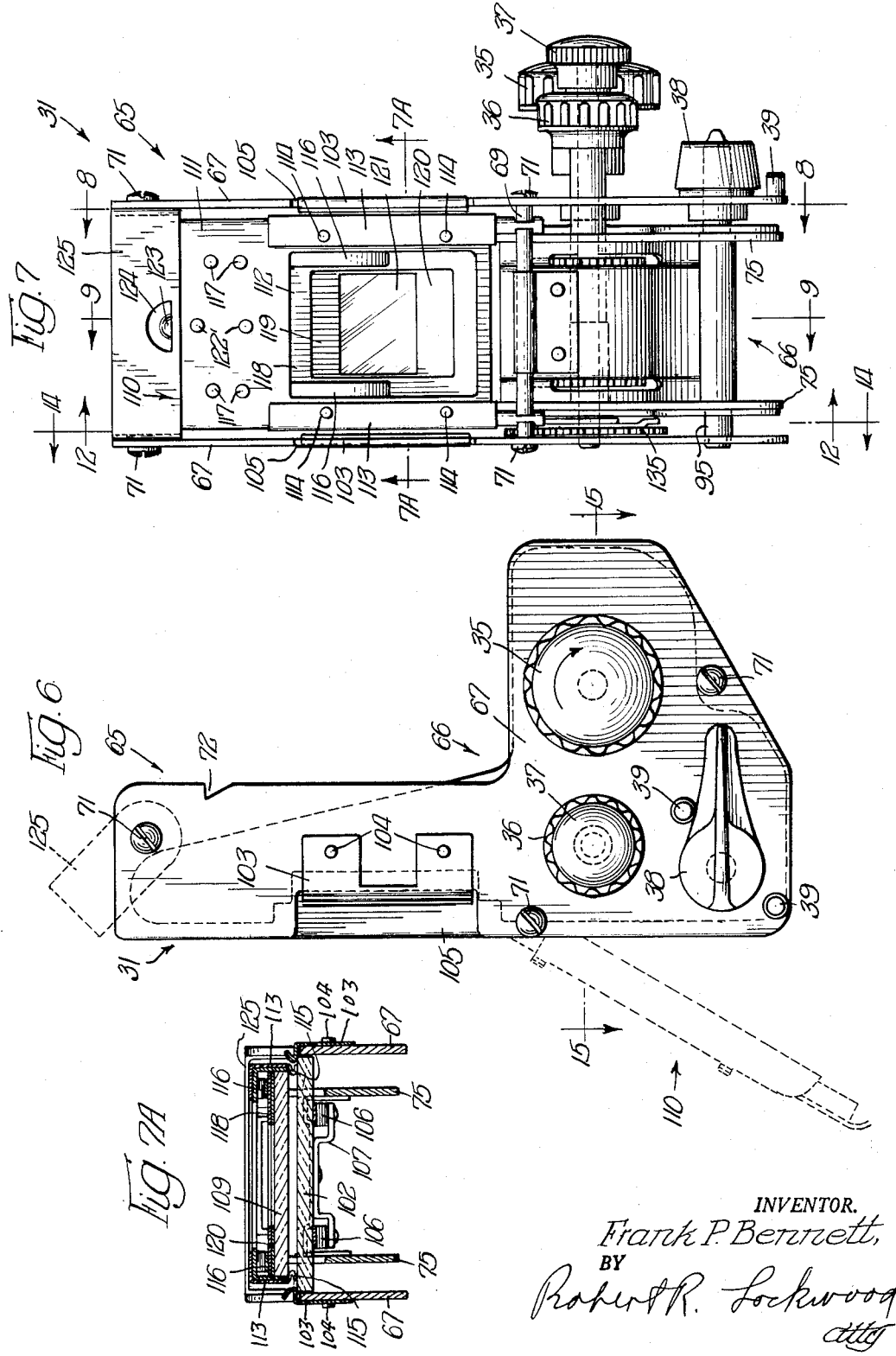

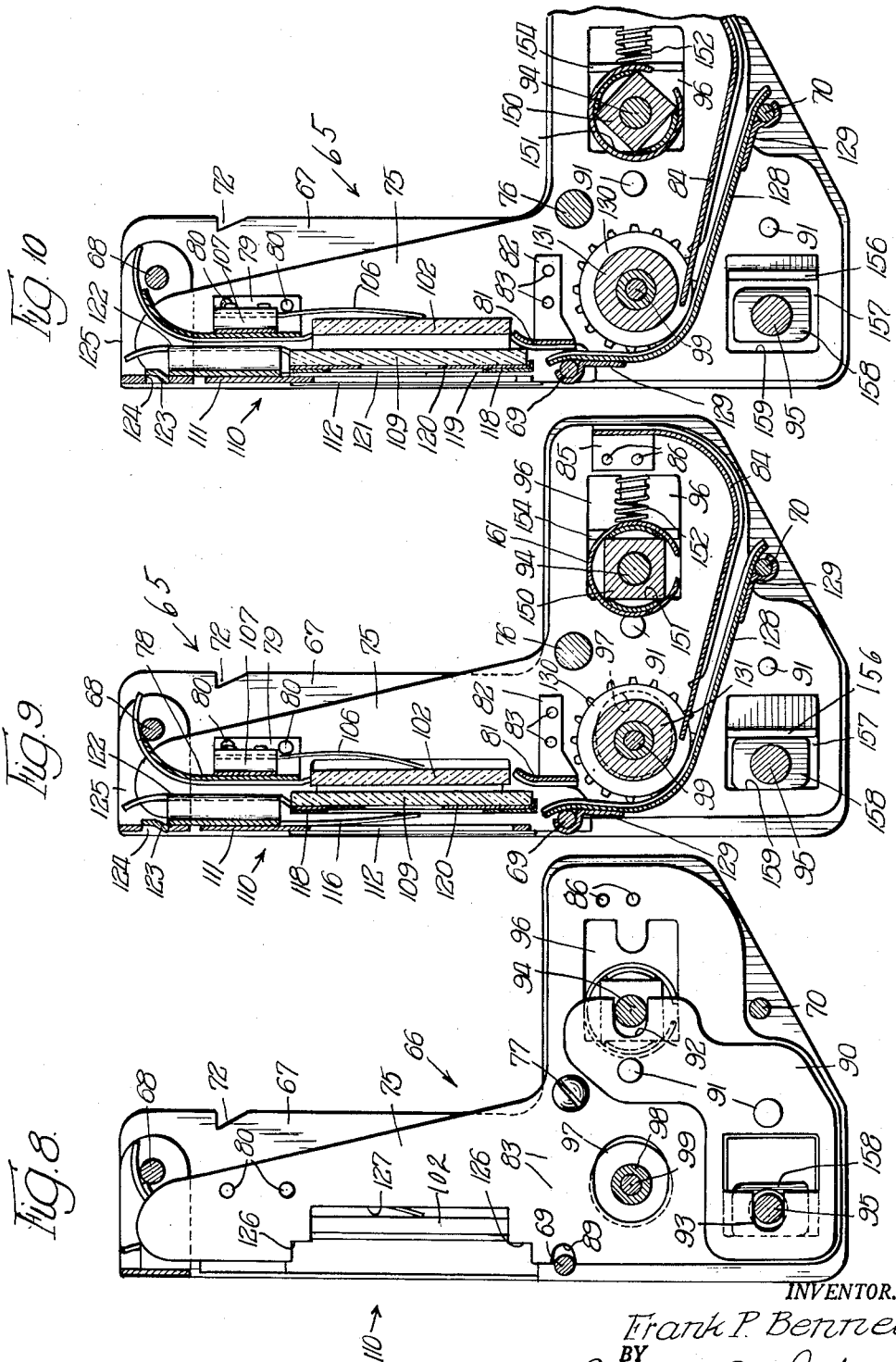

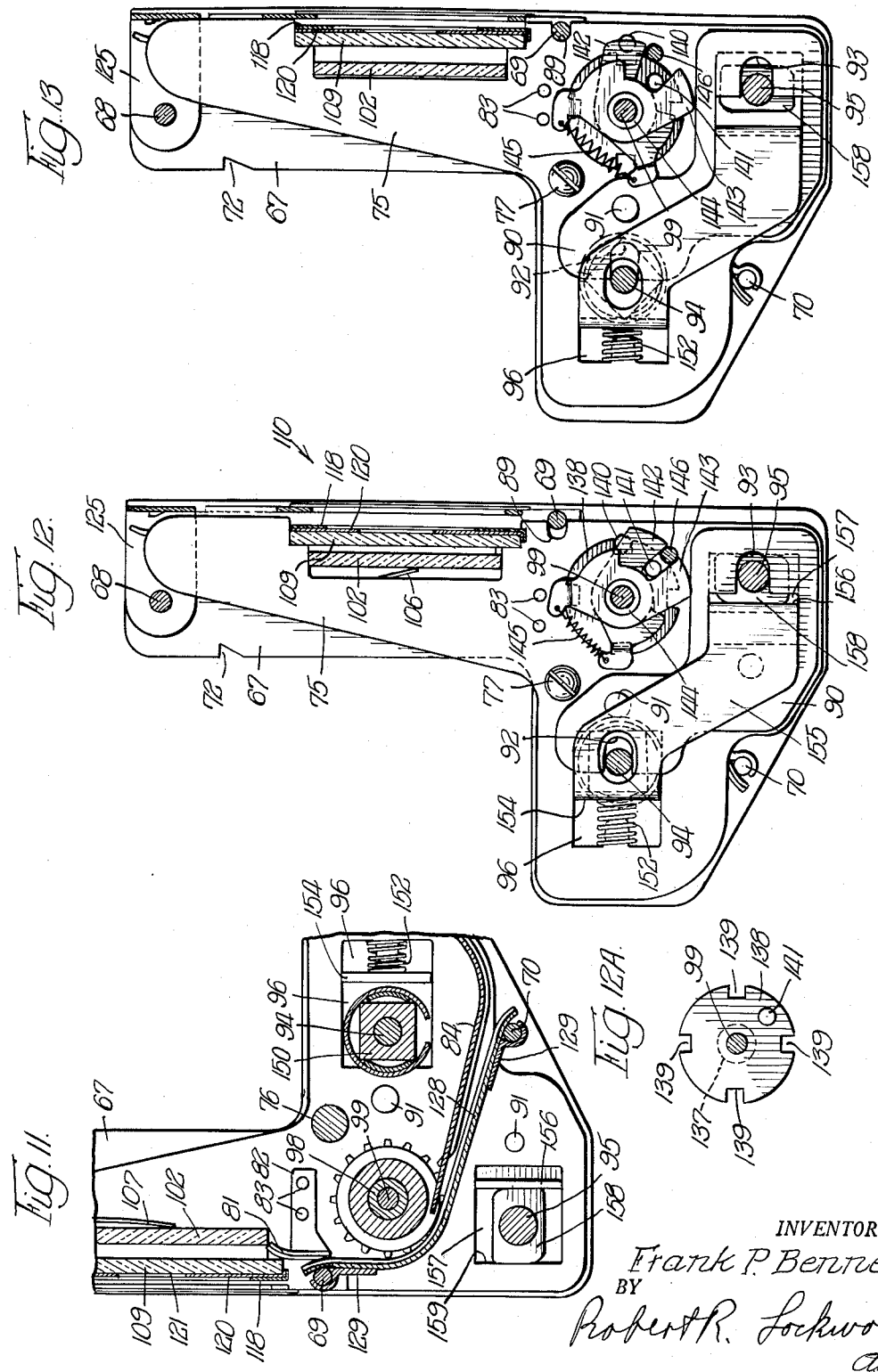

Nov. 29, 1955  F. P. BENNETT  2,724,990
FILM STRIP PROJECTOR
Filed May 15, 1952  6 Sheets-Sheet 6
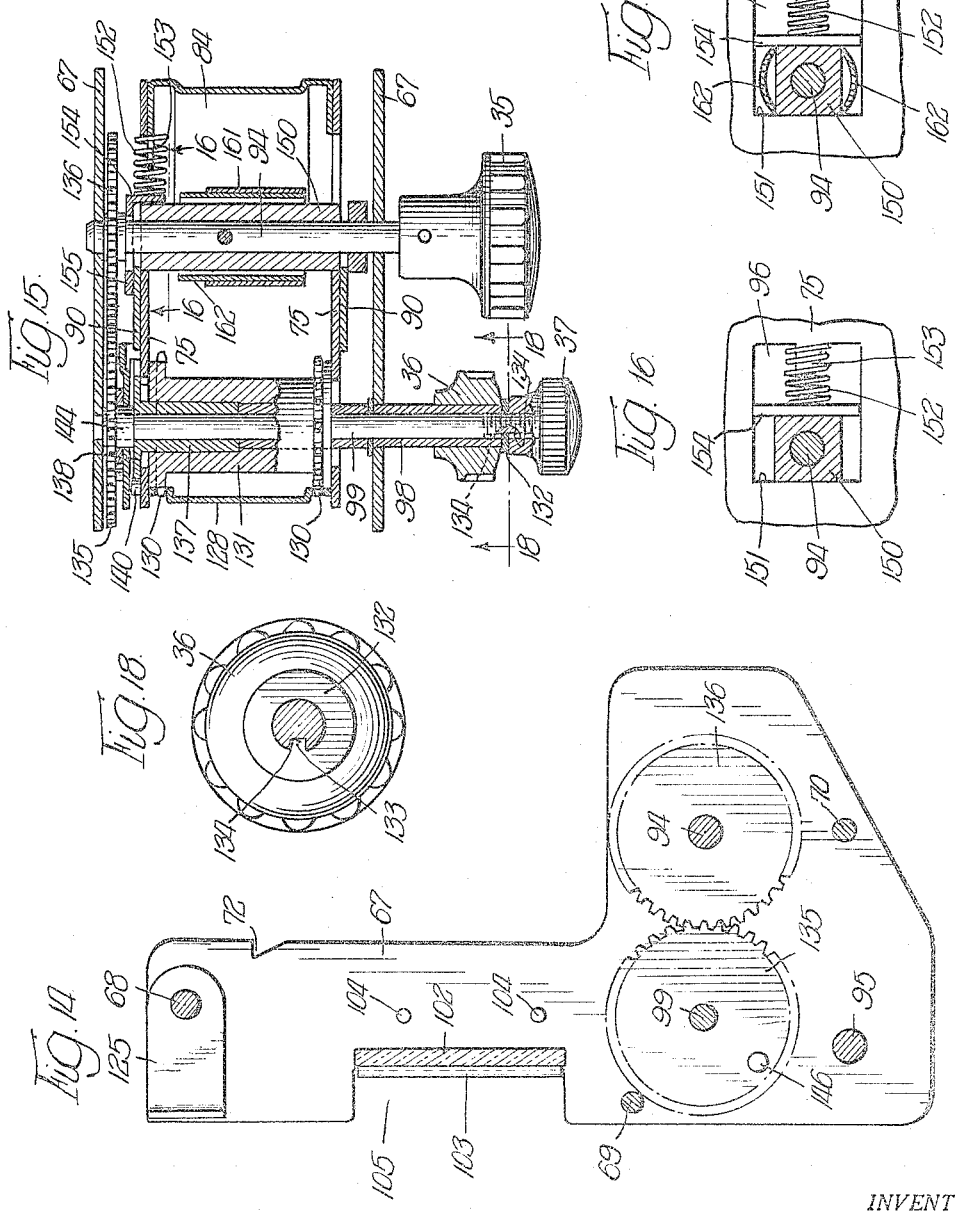
INVENTOR.
Frank P. Bennett,
BY
Robert R. Lockwood
atty

United States Patent Office 2,724,990
Patented Nov. 29, 1955

2,724,990

FILM STRIP PROJECTOR

Frank P. Bennett, Chicago, Ill., assignor, by mesne assignments, to Bell & Howell Company, Chicago, Ill., a corporation of Illinois Application May 15, 1952, Serial No. 287,996

17 Claims. (Cl. 88—28)

This invention relates, generally, to stereopticon projectors and its has particular relation to film strip projectors.

Among the objects of this invention are: To provide for handling film strip in such manner as to avoid the application thereto of any stress likely to tear the same or pressure likely to scratch it; to hold the frame of the film being projected securely and to release the same for shifting to another frame; to guide the film strip while it is being shifted; to employ transparent pressure plates for holding the film strip and tracks for guiding it; to separate the pressure plates and advance the film tracks simultaneously and thereupon to shift the film strip; to mount the film strip handling mechanism in a cartridge that is readily removable from and replaceable in the projector; and to mount the cartridge in a lens mount and provide for swinging the same about the axis of the light beam of the projector to either a vertical or a horizontal position.

Other objects of this invention will, in part, be obvious and in part appear hereinafter.

This invention is diclosed in the embodiment thereof shown in the accompanying drawings and it comprises the features of construction, combination of elements and arrangement of parts which will be exemplified in the construction hereinafter set forth and the scope of the application of which will be indicated in the appended claims.

For a more complete understanding and the nature and scope of this invention reference can be had to the following detailed description, taken together with the accompanying drawings, in which:

Figure 1 is a view, in side elevation, of a stereopticon projector in which the present invention is incorporated;

Figure 2 is a view, in front elevation, of the projector shown in Figure 1, the lens mount being positioned vertically;

Figure 3 is a view, similar to Figure 2, showing the lens mount in a horizontal position;

Figures 4 and 5 are sectional views taken generally along the lines 4—4 and 5—5, respectively, of Figure 1;

Figure 6 is a view, in side elevation, of the film strip cartridge which is insertable in the lens mount shown in Figures 1, 2 and 3 of the drawings, the film gate and latch therefor being shown by broken lines in the opened position;

Figure 7 is a view, in rear elevation, of the cartridge shown in Figure 6, the view being taken looking from left to right;

Figure 7A is a sectional view, taken generally along the line 7A—7A of Figure 7;

Figures 8 and 9 are sectional views taken generally along the lines 8—8 and 9—9, respectively, of Figure 7;

Figure 10 is a view similar to Figure 9 but showing the movable frame shifted so as to separate the pressure plates and advance the film tracks toward each other;

Figure 11 is a view similar to Figure 10, showing how the movable frame is shifted by the film release lever;

Figure 12 is a sectional view taken generally along the line 12—12 of Figure 7;

Figure 12A is a view, in side elevation, of the cam lock, the sprocket shaft on which it is mounted being shown in section.

Figure 13 is a view, similar to Figure 12, illustrating how the scissors spring is tensioned to advance the sprockets for in turn advancing the film strip;

Figure 14 is a sectional view taken along the line 14—14 of Figure 7;

Figure 15 is a sectional view taken along the lines 15—15 of Figure 7;

Figure 16 is a sectional view taken along the lines 16—16 of Figure 15;

Figure 17 is a view, similar to Figure 16, but showing the square cam modified by arcuate sections for the purpose of displaying double frames; and Figure 18 is a sectional view, at an enlarged scale, taken along the line 18—18 of Figure 15.

Referring now particularly to Figure 1 of the drawings it will be observed that the reference character 20 designates, generally, a stereopticon projector which is provided with a base 21 carrying a lamp house 22. A lamp house cover 23 is mounted on the lamp house 22 for the purpose of enclosing the lamp. A lens mount 24 is carried by the lamp house 22 and, as will be described, is arranged to be rotated about the axis of the light beam of the projector 20.

It will be observed that the lens mount 24 is provided with a rectangular recess 25 and that this recess has a slide changer clip 26 disposed therein. The clip 26 is pivoted on a pin 27 and has a rib 28 intermediate its ends for engaging a clip of a slide changer which can be inserted through the rectangular recess 25. A preferred form of slide change is disclosed in Badalich application Serial No. 276,633 filed March 14, 1952, and assigned to the assignee of this application.

While the stereopticon projector 20 can be used in conjunction with the slide changer of the type and character described, the persent invention has to do principally with the construction of a film strip cartridge which is illustrated, generally, at 31 and which is arranged to be inserted in the lens mount 24 and to be removed therefrom as a unit. The cartridge 31 is held in place in the lens mount 24 by means of a cartridge release lever 32. On forward movement of the release lever 32, the film strip cartridge 31 can be withdrawn from the lens mount 24 provided it has been turned to the horizontal position as illustrated in Figure 3.

Mounted on the lens mount 24 is a film rewind bracket 33 which is provided for supporting a film strip 34 of conventional character having the usual series of apertures along the edges for interfitting with sprockets to shift the film strip in known manner.

The cartridge 31 also is provided with a film advance knob 35 which can be rotated in the direction indicated by the arrow thereon for advancing the film strip 34 through the projector. A framing knob 36 is provided for shifting the film strip 34 independently of the film advance knob 35 for the purpose of properly framing the film strip. There is provided a frame lock knob 37 which cooperates with the framing knob 36 after the film strip has been framed properly for locking the same in position. The cartridge 31 also is provided with a film release lever 38 which is employed for opening the pressure plates and bringing the film tracks close together, as will be described, to facilitate threading of the film strip 34 into the cartridge 31. Stops 39 cooperate with the film release lever 38 to limit its movement either in the horizontal position, as illustrated, or in a vertical position.

As illustrated more clearly in Figures 2, 3 and 5 of the drawings, a film rewind shaft 42 is carried by the bracket 33 and it is arranged to be rotated by a film rewind knob 43. A film clip 44 is carried by a rewind disc 45 for securing one end of the film strip 34 against the film rewind shaft 42.

As pointed out hereinbefore, provision is made for rotating the lens mount 24 about the axis 46 of the light beam of the projector. The purpose of this is to permit the projector to be employed either for showing single frames or double frames of the film strip 34 as may be desired. For this purpose a mounting plate 47, Figure 4, is carried by the lamp house 22, being secured thereto by a flange 48 at the bottom and a screw 49 at the top. The mounting plate 47 has an integrally formed cylindrical neck 50 which projects through a circular opening 51 in a lens mount plate 52 and it has a lip 53, Figure 5, spun over the edge of the circular opening 51 so as to provide a groove in which the circular edge of the plate 52 can be rotated. It will be noted that the lens mount 52 is secured in position on the lens mount 24 by screws 54.

It is desirable to hold the lens mount 24 and parts associated therewith in either the vertical position, as shown in Figure 2, or the horizontal position, as shown in Figure 3. For this purpose a lens mount holding spring 55 is employed. It has a hairpin shaped central portion 56, the apex of which surrounds a pin 57 that projects from the plate 52. Arms 58 of the spring 55 extend between pins 59, also projecting from the plate 52, and terminate in arcuate end portions 60. One or the other of these arcuate end portions 60 is arranged to cooperate with the head of a stud 61 which extends from the mounting plate 47, as shown in Figure 4.

The details of construction of the film strip cartridge 31 are illustrated more clearly in the remaining figures of the drawings to which reference now will be had, reference first being had to Figures 6, 7, 8 and 9. The cartridge 31 comprises principally an outer stationary frame that is indicated generally at 65 and an inner movable frame that is indicated generally at 66. The inner frame 66, as will be described, is mounted to have only translatory movement with respect to the outer frame 65. The purpose of this relative movement is to separate the transparent pressure plates which engage opposite sides of the particular frame of the film strip 34 being projected so as to permit the film strip to be advanced without likelihood of its being scratched as the result of pressure applied thereto by the pressure plates. In addition this relative translatory movement of the frames 65 and 66 causes the film tracks above and below the pressure plates to advance toward each other so as to guide the film strip 34 while it is being advanced to the next frame.

The outer stationary frame 65 comprises a pair of L-shaped shroud plates 67 which are spaced apart and secured as a unit together by three tie rods or shafts 68, 69 and 70. Screws 71 projecting through the shroud plates 67 and threaded into the ends of the respective tie rods or shafts 68, 69, and 70 serve to hold these plates in position. It will be observed that the shroud plates 67 have notches 72 near their upper ends, these for the purpose of cooperating with the release lever 32 for holding the cartridge 31 in position in the lens mount 24.

The inner movable frame 66 comprises a pair of L-shaped cam plates 75 which are held in spaced relation partly by means of a tie rod 76 with screws 77 projecting through the plates 75 and threaded into the ends thereof. In addition the cam plates 75 are held in spaced parallel relation by an upper front film track 78 which is provided with ears 79 that are secured by rivets 80 to the respective cam plate 75. In addition there is provided an intermediate front film track 81 having ears 82 formed integrally therewith and extending along the inner sides of the plates 75 to which they are secured by rivets 83. Also there is provided a lower front film track 84 which has ears 85 formed integrally therewith and extending along the inner sides of the cam plates 75. Rivets 86 secure the ears 85 to the cam plates 75. Now it will be understood that the film tracks 78, 81 and 84 move together with the inner movable frame 66 as the same is moved rearwardly or to the left, looking at Figures 6, 8, 9 and 10, for example.

It has been pointed out that the inner frame 66 is mounted to have translatory movement with respect to the outer frame 65. For this purpose the cam plates 75 are provided with horizontal notches 89 which, as shown more clearly in Figure 8, cooperate with the tie rod or shaft 69 for guiding the inner frame 66. In addition a guide plate 90 is secured by rivets 91 to the outer sides of each of the cam plates 75 and at the ends of the guide plates 90 are provided horizontal notches 92 and 93 which operate, respectively, with a drive shaft 94 and a release cam shaft 95 that are journalled on the shroud plates 67. By providing the horizontal notches 89, 92 and 93, three point support is had for guiding the inner frame 66 with respect to the outer frame 65. In order to permit this relative movement the cam plates 75 have generally rectangular openings 96 through which the drive shaft 94 projects and oval openings 97 through which a sprocket sleeve 98 and a sprocket shaft 99 project.

Referring now particularly to Figures 9 and 10 of the drawings, it will be observed that the stationary frame 65 between the shroud plates 67 carries a front transparent pressure plate 102, preferably formed of glass and rectangular in shape. The pressure plate 102 is movably mounted on the stationary frame 65 and is held against rearward movement with respect thereto by front plate retainer spring clips 103, Figure 6. Each of the shroud plates 67 is provided with a retainer spring clip 103 and the same is secured by rivets 104. The pressure plate 102 is of such width as to set between the shroud plates 67 and the rear portions of the retainer spring clips 103 project inwardly from the inner sides of these plates 67 so as to limit the rearward movement of the front pressure plate 102. It will be observed that the rear edges of the spring clips 103 project inwardly through rectangular notches 105 in the shroud plates 67. The front pressure plate 102 is held in position against the spring clips 103 by leaf springs 106, Figure 9, which extend downwardly from a leaf spring retainer 107 that is carried by the upper front film track 78.

Cooperating with the front pressure plate 102 is a rear transparent pressure plate 109 also preferably formed of glass and it is arranged to engage the opposite side of the film strip 34 for holding the frame thereof to be projected in the focal plane of the projector. The rear pressure plate 109 is carried by the outer stationary frame 65 and is movably mounted thereon. More particularly the rear pressure plate 109 is carried by a film gate shown, generally, at 110 which is hinged on the tie rod or shaft 69 as shown more clearly in Figures 7 and 9 of the drawings. The film gate 110 includes a door 111 having a rectangular aperture 112, Figure 7, through which the light rays from the projector pass. The rear pressure plate 109 is held in position by resilient plate retainer clips 113 that are secured by rivets 114 to the door 111. As shown more clearly in Figure 7A forward movement of the rear pressure plate 109 is limited by inturned resilient stop fingers 115. These fingers 115 are located near the upper and lower ends of the retainer clips 113 and thus limit the forward movement of the rear pressure plate 109. The rear pressure plate 109 is held against the inturned resilient stop fingers 115 by leaf springs 116 which are secured by rivets 117, Figure 7, to the upper portion of the door 111. As will appear hereinafter provision is made for moving the rear pressure plate 109 rearwardly to separate it from the front pressure plate 102 by rearward movement of the inner movable frame 66.

As shown in Figure 7 a masking plate 118 is carried by the door 110 and it has a double frame aperture 119. Also there is provided a second masking plate 120 on the door 111 and it has a single frame aperture 121. It will be understood that, when it is desired to display pictures through the double frame aperture 119 of the masking plate 118, the masking plate 120 will be removed from the door 110.

At its upper end the door 111 carries an upper rear film track 122 which is secured to the former by rivets 122' as shown in Figure 7. A detent 123 is pressed outwardly from the central portion of the upper rear film track 122, as shown more clearly in Figures 7 and 9 of the drawings to project through an aperture 124 in a film gate latch 125 that is rockably mounted on the tie rod 68. It will be understood, that when the film gate latch 125 is shifted to the position shown by the broken lines of Figure 6, the film gate 110 can be swung to the position thereof shown by the broken lines for the purpose of exposing the pressure plates 102 and 109 for cleaning and other purposes.

It will be appreciated that the rear pressure plate 109, shown in Figure 9, is longer in a vertical direction than is the front pressure plate 102. Shoulders 126, Figure 8, are formed on the cam plates 75 of the inner frame 66 and bear against the adjacent front surface portions of the rear pressure plate 109 so that, when the frame 66 is moved rearwardly relative to the stationary frame 65, the rear pressure plate 109 is moved away from the front pressure plate 102 as illustrated in Figure 10. As shown in Figure 8 each of the cam plates 75 is provided with a rectangular notch 127 which spans the vertical length of the front pressure plate 102 and permits it to remain stationary while the inner frame 66 is moved rearwardly and carries with it the rear pressure plate 109 by engagement by the shoulders 126. This construction makes it possible to locate accurately the front pressure plate 102 and then to move the rear pressure plate 102 to provide the necessary opening so that the film strip can be moved between the pressure plates in spaced relation without any pressure being applied thereby to the film strip likely to cause scratching thereof or other damage.

The outer frame 65 carries a lower film track 128 which is shown more clearly in Figure 9. Clips 129 at the ends of the lower film track 128 serve to secure the same to the tie rods or shafts 69 and 70 as illustrated.

As illustrated more clearly in Figures 9 and 15 of the drawings the film strip is advanced by means of sprockets 130 which are located at the ends of a drum 131 that is secured to and rotates with the sprocket sleeve 98. The framing knob 36 is also fast on the sprocket sleeve 98 and thus rotates conjointly with the drum 131 and sprockets 130. In order to provide a driving connection between the sprocket shaft 99 and the sprocket sleeve 98 there is provided a framing washer 132, Figure 18, which has a key 133 extending radially inwardly therefrom into a key way 134 in the sprocket shaft 99. When the frame lock knob 37 is tightened on the threaded end of the sprocket shaft 99, the framing washer 132 is securely clamped between the knobs 36 and 37 and thus provides a driving connection from the sprocket shaft 99 to the sprockets 130.

Loosely mounted on the end of the sprocket shaft 99 away from the knobs 36 and 37 is a driven gear 135. It meshes with a drive gear 136 that is fast on drive shaft 94 which is rotated by the film advance knob 35 secured thereto. It is desirable to provide a lost motion connection between the driven gear 135 and the sprocket shaft 99. The purpose of this is to permit the inner frame 66 to be moved for the purpose of separating the pressure plates 102 and 109 without causing any movement of the sprockets 130. After the pressure plates 102 and 109 are separated and the film tracks are advanced to guide the film strip therebetween, the arrangement is such that thereupon a driving connection is established between the driven gear 135 and the sprocket shaft 99. Fast on the sprocket shaft 99 is a sleeve 137 which has a cam lock 138 formed integrally therewith. This is shown more clearly in Figure 12A of the drawings. The cam lock 138, which is circular in shape, has notches 139 spaced at 90° about its periphery. These notches 139 are arranged to interfit with a detent 140, Figure 12, which is carried by the adjacent cam plate 75 of the inner frame 66. As long as the inner frame 66 occupies the position as shown in Figure 12, which is the forward position, with the pressure plates 102 and 109 in engagement with opposite sides of the film strip, the detent 140 is in engagement with one of the notches 139 on the cam lock 138. When the inner frame 66 is moved rearwardly to separate the pressure plates 102 and 109, the detent 140 is moved out of the notch 139 in which it was previously located and thus frees the cam lock 138 for movement.

The cam lock 138 is driven intermittently by a driven pin 141 which projects therefrom into a position between scissors 142 and 143 which are rockably mounted on a collar 144 that is freely rotatable on the sprocket shaft 99. A coil tension scissors spring 145 acts to bias the scissors 142 and 143 toward each other as illustrated in Figure 12. Also positioned between the scissors 142 and 143 is a drive pin 146 which is carried by the driven gear 135.

As the driven gear 135 is rotated by rotation of the film advance knob 35, there is a corresponding movement of the drive pin 146 as illustrated more clearly in Figure 13 of the drawings. However, since the cam lock 138 is prevented from rotating by the detent 140, the drive pin 146 merely shifts the scissor 142 to the position shown in Figure 13 and tensions the scissors spring 145. As soon as the inner frame 66 is shifted to the rear, by means to be described presently, the detent 140 is moved out of the notch 139 in which it previously was positioned. This then frees the cam lock 138 and permits the scissors spring 145 to act through the driven pin 141 so as to advance the sprockets 130 with a snap action. Thereafter continued rotation of the film advance knob 35 causes a direct drive for the sprockets 130 to advance the film strip for one or two frames or more depending upon the adjustment of the driving mechanism.

As shown more clearly in Figures 9, 10 and 15 of the drawings a cam 150 having a square cross section is secured to the drive shaft 94 and rotates therewith when the film advance knob 35 is rotated. The corners of the square cam 150 are arranged to engage a flat cam surface 151, Figure 16, at the rear ends of the ractangular openings 96 in the cam plates 75. Thus, as the square cam is rotated through 90°, since the shaft 94 is journalled about a stationary axis in the shroud plates 67 of the outer frame 65, the inner frame 66 will be moved rearwardly to the extent determined by the radial distance from the axis of the drive shaft 94 to the corners of the square cam 150.

The inner frame 66 is returned to the forward position by a coil compression spring 152 that is guided on a tab 153 formed integrally with one of the cam plates 75 and bears against the adjacent end of the rectangular opening 96 therein. The other end of the coil compression spring 152 bears against an inturned end 154 of a follower plate 155, Figure 12, which extends over one of the guide plates 90 and has another inturned end 156, Figure 9, extending into a rectangular opening 157 in the cam plate 75, this opening having the release cam shaft 95 extending therethrough.

When it is desired to separate the pressure plates 102 and 109 to permit the threading of the film therebetween, the film release lever 38, which is fast on the release cam shaft 95 is swung downwardly from the horizontal to the downturned vertical position. This movement of the cam shaft 95 causes cams 158 fast on the shaft 95 to rotate to the position shown in Figure 11 so as to engage the rear side 159 of the rectangular opening 157 and move the inner frame 66 independently of the movement caused by the rotation of the square cam 150.

When it is desired to show double rather than single frames of the film strip, suitable adjustment is made for the purpose of effecting a corresponding double advance of the film strip. For this purpose there is provided a sleeve 161, Figures 9 and 15 of the drawings, which is slidable along the square cam 150. Projecting from the sleeve 161 are arcuate sections 162, Figure 17, which overlie two opposite sides of the square cam 150. When the sleeve 161 is moved along the square cam 150 to such position that the arcuate sections 162 engage the flat cam surface 151, the inner frame 66 is permitted to return only twice for each revolution of the film advance knob 35, rather than four times as is the case when the sleeve 161 is positioned, as shown in Figure 15, so that the arcuate sections 162 do not register with the cam surface 151. Thus the sleeve 161 and the arcuate sections 162 provide a double cam effect while the cam 150 provides a quadruple cam effect.

In operation assuming that it is desired to display single frame pictures, the masking plates 118 and 120 are arranged as shown in Figure 7. With the cartridge 31 in position, as shown in Figure 1, and the film strip 34 properly mounted on the film rewind shaft 42 with the inner end underneath the spring clip 44, the other free end of the film strip is grasped between the thumb and forefinger of the left hand while the right hand swings the film release lever 38 downwardly to the vertical position. This operates the cams 158 to move the inner frame 66 rearwardly, as shown in Figure 11, thereby separating the pressure plates 102 and 109 and bringing the upper front track 78 intermediate front track 81 and lower front track 84 close to the upper rear track 122 and the lower rear track 128. The free end of the film strip is fed downwardly between the juxtaposed upper front and rear film tracks and between the spaced apart pressure plates 102 and 109 and between the intermediate front track 81 and the upper end of the lower film track 128. When the lower end of the film strip reaches the sprockets 130, the advance knob 35 is rotated to pick up the film strip and advance it until the focus frame appears on the screen. Then the release lever 38 is shifted upwardly to the horizontal position and the film advance knob 35 is rotated until one side of the square cam 150 engages flatwise with the cam surface 151. Next the frame lock knob 37 is loosened and the framing knob is rotated to advance the film strip independently of the operating mechanism so as to bring the focus frame into the proper position. Thereafter the frame lock knob 37 is tightened and the projector is ready for operation. Of course it is assumed that the light in the projector has been turned on and that the device has been properly focused by moving the projecting lens relative to the lens mount 24 so as to focus properly the picture on the screen.

The successive frames of the film strip are shown by rotating the film advance knob 35 in the direction indicated by the arrow thereon as shown in Figure 1. If desired the film advance knob 35 can be rotated in the reverse direction to back up the film strip as may be desired. When it is desired to move the film strip rapidly in either a forward or a reverse direction, the film release lever 38 can be turned downwardly to the vertical position whereupon the film advance knob 35 can be rotated freely so as to move the film quickly to the desired frame.

When the showing of the film strip has been completed, it can be rewound on the shaft 42 by operating the film release lever 38 downwardly to the vertical position and then twirling the rewind shaft 42 by rotating the knob 43. This can be done rapidly by twirling a knurled projection 164 extending from the film rewind shaft 42.

Since certain changes can be made in the foregoing construction and different embodiments of the invention can be made without departing from the spirit and scope thereof, it is intended that all matters shown in the accompanying drawings and described hereinbefore, shall be interpreted as illustrative and not in a limiting sense.

What is claimed as new is:

1. In a film strip projector, in combination, a stationary frame, a movable frame carried and guided by said stationary frame for translatory movement along the light beam of the projector, a front transparent pressure plate movably carried by said stationary frame transversely of the light beam, a rear transparent pressure plate movably carried by said stationary frame transversely of the light beam, said pressure plates being arranged to engage opposite sides of the film strip to hold it in the focal plane of the projector, spring means on said stationary frame biasing said rear pressure plate forwardly, spring means on said movable frame biasing said front pressure plate rearwardly, and means for moving said movable frame rearwardly along the light beam thereby to transitorily move said rear pressure plate rearwardly to release the film strip.

2. In a film strip projector, in combination, a stationary frame, a movable frame carried and guided by said stationary frame for translatory movement along the light beam of the projector, a front transparent pressure plate movably mounted on said stationary frame transversely of the light beam, stop means on said stationary frame limiting rearward movement of said front pressure plate, spring means on said movable frame biasing said front pressure plate against its stop means, a rear transparent pressure plate movably mounted on said stationary frame transversely of the light beam and engageable by said movable frame, stop means on said stationary frame limiting forward movement of said rear pressure plate, spring means on said stationary frame biasing said rear pressure plate against the stop means, said pressure plates being arranged to engage opposite sides of the film strip to hold it in the focal plane of the projector, and means for moving said movable frame rearwardly along said light beam thereby to transitorily move said rear pressure plate rearwardly to release the film strip.

3. In a film strip projector, in combination, a stationary frame, a movable frame carried and guided by said stationary frame for translatory movement along the light beam of the projector, a front transparent pressure plate carried by said stationary frame transversely of the light beam, a rear transparent pressure plate movably carried by said stationary frame transversely of the light beam, said pressure plates being arranged to engage opposite sides of the film strip to hold it in the focal plane of the projector, upper front and rear film tracks carried respectively by said movable and stationary frames, lower front and rear film tracks carried respectively by said movable and stationary frames, and means for moving said movable frame rearwardly along said light beam thereby to transitorily move said rear pressure plate rearwardly to release the film strip and said upper and lower front film tracks rearwardly to guide the film strip.

4. In a film strip projector, in combination, a stationary frame, a movable frame carried and guided by said stationary frame for translatory movement along the light beam of the projector, a front transparent pressure plate movably carried by said stationary frame transversely of the light beam, a rear transparent pressure plate movably carried by said stationary frame transversely of the light beam, said pressure plates being arranged to engage opposite sides of the film strip to hold it in the focal plane of the projector, spring means on said stationary frame biasing said rear pressure plate forwardly, spring means on said movable frame biasing said front pressure plate rearwardly, upper front and rear film tracks carried respectively by said movable and stationary frames, lower front and rear film tracks carried respectively by said movable and stationary frames, and means for moving said movable frame rearwardly along said light beam thereby to transitorily move said rear pressure plate rearwardly to release the film strip and said upper and lower front film tracks rearwardly to guide the film strip.

5. In a film strip projector, in combination, a stationary frame, a movable frame carried and guided by said stationary frame for translatory movement along the light beam of the projector, a front transparent pressure plate movably mounted on said stationary frame transversely of the light beam, stop means on said stationary frame limiting rearward movement of said front pressure plate, spring means on said movable frame biasing said front pressure plate against its stop means, a rear transparent pressure plate movably mounted on said stationary frame transversely of the light beam and engageable by said movable frame, stop means on said stationary frame limiting forward movement of said rear pressure plate, spring means on said stationary frame biasing said rear pressure plate against its stop means, said pressure plates being arranged to engage opposite sides of the film strip to hold it in the focal plane of the projector, upper front and rear film tracks carried respectively by said movable and stationary frames, lower front and rear film tracks carried respectively by said movable and stationary frames, and means for moving said movable frame rearwardly along said light beam thereby to transitorily move said rear pressure plate rearwardly to release the film strip and said upper and lower front film tracks rearwardly to guide the film strip.

6. In a film strip projector, in combination, a stationary frame, a movable frame carried and guided by said stationary frame for translatory movement along the light beam of the projector, a front transparent pressure plate carried by said stationary frame transversely of the light beam, a rear transparent pressure plate movably carried by said stationary frame transversely of the light beam, said pressure plates being arranged to engage opposite sides of the film strip to hold it in the focal plane of the projector, upper front and rear film tracks carried respectively by said movable and stationary frames, lower front and rear film tracks carried respectively by said movable and stationary frames, and sprocket means rotatably mounted below said pressure plates on said stationary frame for advancing the film strip, and operating means carried by said stationary frame and cooperating with said movable frame and said sprocket means for moving the former rearwardly along said light beam thereby to transitorily move said rear pressure plate rearwardly to release the film strip and to move said upper and lower front film tracks rearwardly to guide the film strip and for rotating said sprocket means to shift the film strip.

7. In a film strip projector, in combination, a stationary frame, a movable frame carried and guided by said stationary frame for translatory movement along the light beam of the projector, a front transparent pressure plate carried by said stationary frame transversely of the light beam, a rear transparent pressure plate movably carried by said stationary frame transversely of the light beam, said pressure plates being arranged to engage opposite sides of the film strip to hold it in the focal plane of the projector, spring means on said stationary frame biasing said rear pressure plate forwardly, spring means on said movable frame biasing said front pressure plate rearwardly, upper front and rear film tracks carried respectively by said movable and stationary frames, lower front and rear film tracks carried respectively by said movable and stationary frames, sprocket means rotatably mounted below said pressure plates on said stationary frame for advancing the film strip, and operating means carried by said stationary frame and cooperating with said movable frame and said sprocket means for moving the former rearwardly along said light beam thereby to transitorily move said rear pressure plate rearwardly to release the film strip and to move said upper and lower front film tracks rearwardly to guide the film strip and for rotating said sprocket means to shift the film strip.

8. In a film strip projector, in combination, a stationary frame, a movable frame carried and guided by said stationary frame for translatory movement along the light beam of the projector, a front transparent pressure plate movably mounted on said stationary frame transversely of the light beam, stop means on said stationary frame limiting rearward movement of said front pressure plate, spring means on said movable frame biasing said front pressure plate against its stop means, a rear transparent pressure plate movably mounted on said stationary frame transversely of the light beam and engageable by said movable frame, stop means on said stationary frame limiting forward movement of said rear pressure plate, spring means on said stationary frame biasing said rear pressure plate against its stop means, said pressure plates being arranged to engage opposite sides of the film strip to hold it in the focal plane of the projector, upper front and rear film tracks carried respectively by said movable and stationary frames, lower front and rear film tracks carried respectively by said movable and stationary frames, sprocket means rotatably mounted below said pressure plates on said stationary frame for advancing the film strip, and operating means carried by said stationary frame and cooperating with said movable frame and said sprocket means for moving the former rearwardly along said light beam thereby to transitorily move said rear pressure plate rearwardly to release the film strip and to move said upper and lower front film tracks rearwardly to guide the film strip and for rotating said sprocket means to shift the film strip.

9. In a film strip projector, in combination, a stationary frame, a movable frame carried and guided by said stationary frame for translatory movement along the light beam of the projector, a front transparent pressure plate carried by said stationary frame transversely of the light beam, a rear transparent pressure plate movably carried by said stationary frame transversely of the light beam, said pressure plates being arranged to engage opposite sides of the film strip to hold it in the focal plane of the projector, upper front and rear film tracks carried respectively by said movable and stationary frames, lower front and rear film tracks carried respectively by said movable and stationary frames, sprocket means rotatably mounted below said pressure plates on said stationary frame for advancing the film strip, intermittently operable driving means for said sprocket means and said movable frame, and operating means carried by said stationary frame for operating said driving means for moving said movable frame rearwardly along said light beam to translatorily move said rear pressure plate rearwardly to release the film strip and to move said upper and lower film tracks rearwardly to guide the film strip and for rotating said sprocket means to shift the film strip one frame while said pressure plates are separated and said film tracks are juxtaposed.

10. In a film strip projector, in combination, a stationary frame, a movable frame carried and guided by said stationary frame for translatory movement along the light beam of the projector, a front transparent pressure plate carried by said stationary frame transversely of the light beam, a rear transparent pressure plate movably carried by said stationary frame transversely of the light beam, said pressure plates being arranged to engage opposite sides of the film strip to hold it in the focal plane of the projector, spring means on said stationary frame biasing said rear pressure plate forwardly, spring means on said movable frame biasing said front pressure plate rearwardly, upper front and rear film tracks carried respectively by said movable and stationary frames, lower front and rear film tracks carried respectively by said movable and stationary frames, sprocket means rotatably mounted below said pressure plates on said stationary frame for advancing the film strip, intermittently operable driving means for said sprocket means and said movable frame and operating means carried by said stationary frame for operating said driving means for moving said movable frame rearwardly along said light beam to translatorily move said rear pressure plate rearwardly to release the film strip and to move said upper and lower film tracks rearwardly to guide the film strip and for rotating said sprocket means to shift the film strip one frame while said pressure plates are separated and said film tracks are juxtaposed.

11. In a film strip projector, in combination, a stationary frame, a movable frame carried and guided by said stationary frame for translatory movement along the light beam of the projector, a front transparent pressure plate movably mounted on said stationary frame transversely of the light beam, stop means on said stationary frame limiting rearward movement of said front pressure plate, spring means on said movable frame biasing said front pressure plate against its stop means, a rear transparent pressure plate movably mounted on said stationary frame transversely of the light beam and engageable by said movable frame, stop means on said stationary frame limiting forward movement of said rear pressure plate, spring means on said stationary frame biasing said rear pressure plate against its stop means, said pressure plates being arranged to engage opposite sides of the film strip to hold it in the focal plane of the projector, upper front and rear film tracks carried respectively by said movable and stationary frames, lower front and rear film tracks carried respectively by said movable and stationary frames, sprocket means rotatably mounted below said pressure plates on said stationary frame for advancing the film strip, intermittently operable driving means for said sprocket means and said movable frame and operating means carried by said stationary frame for operating said driving means for moving said movable frame rearwardly along said light beam to translatorily move said rear pressure plate rearwardly to release the film strip and to move said upper and lower film tracks rearwardly to guide the film strip and for rotating said sprocket means to shift the film strip one frame while said pressure plates are separated and said film tracks are juxtaposed.

12. In a film strip projector, in combination, a stationary frame, a movable frame carried and guided by said stationary frame for translatory movement along the light beam of the projector, a front transparent pressure plate carried by said stationary frame transversely of the light beam, a rear transparent pressure plate movably carried by said stationary frame transversely of the light beam, said pressure plates being arranged to engage opposite sides of the film strip to hold it in the focal plane of the projector, upper front and rear film tracks carried respectively by said movable and stationary frames, lower front and rear film tracks carried respectively by said movable and stationary frames, sprocket means rotatably mounted below said pressure plates on said stationary frame for advancing the film strip, intermittently operable driving means for said sprocket means and said movable frame, operating means carried by said stationary frame for operating said driving means for moving said movable frame rearwardly along said light beam to translatorily move said rear pressure plate rearwardly to release the film strip and to move said upper and lower film tracks rearwardly to guide the film strip and for rotating said sprocket means to shift the film strip one frame while said pressure plates are separated and said film tracks are juxtaposed, and cam means carried by said stationary frame and cooperating with said movable frame to move the same rearwardly independently of said intermittently operable driving means.

13. In a film strip projector, in combination, a stationary frame, a movable frame carried and guided by said stationary frame for translatory movement along the light beam of the projector, a front transparent pressure plate carried by said stationary frame transversely of the light beam, a rear transparent pressure plate movably carried by said stationary frame transversely of the light beam, said pressure plates being arranged to engage opposite sides of the film strip to hold it in the focal plane of the projector, upper front and rear film tracks carried respectively by said movable and stationary frames, lower front and rear film tracks carried respectively by said movable and stationary frames, sprocket means rotatably mounted below said pressure plates on said stationary frame for advancing the film strip, intermittently operable driving means for said sprocket means and said movable frame, operating means carried by said stationary frame for operating said driving means for moving said movable frame rearwardly along said light beam to translatorily move said rear pressure plate rearwardly to release the film strip and to move said upper and lower film tracks rearwardly to guide the film strip and for rotating said sprocket means to shift the film strip one frame while said pressure plates are separated and said film tracks are juxtaposed, and locking means interconnecting said sprocket means and said intermittently operable driving means and releasable to permit independent rotation of said sprocket means.

14. In a film strip projector, in combination, an outer stationary frame, an inner movable frame carried and guided by said stationary frame for translatory movement along the light beam of the projector, a front transparent pressure plate carried by said stationary frame transversely of the light beam, a film gate hinged to said stationary frame and a latch for holding the same in operative position thereon, a rear transparent pressure plate movably carried by said film gate transversely of the light beam, said pressure plates being arranged to engage opposite sides of the film strip to hold it in the focal plane of the projector, and means for moving said movable frame rearwardly along the light beam thereby to transitorily move said rear pressure plate rearwardly to release the film strip.

15. In a film strip projector, in combination, an outer stationary frame comprising a pair of shroud plates and shaft means holding the same in parallel spaced relation, an inner movable frame comprising a pair of cam plates and means holding the same in parallel spaced relation, said cam plates having aligned slotted apertures cooperating with certain of said shaft means whereby the same is guided for translatory movement along the light beam of the projector, a front transparent pressure plate carried by said stationary frame transversely of the light beam, a rear transparent pressure plate movably carried by said stationary frame transversely of the light beam, said pressure plates being arranged to engage opposite sides of the film strip to hold it in the focal plane of the projector, and means for moving said movable frame rearwardly along the light beam thereby to transitorily move said rear pressure plate rearwardly to release the film strip.

16. In a film strip projector, in combination, an outer stationary frame comprising a pair of shroud plates and shaft means holding the same in parallel spaced relation, an inner movable frame comprising a pair of cam plates and means holding the same in parallel spaced relation, said cam plates having aligned slotted apertures cooperating with the drive and cam shaft means whereby the same is guided for translatory movement along the light beam of the projector, a front transparent pressure plate carried by said stationary frame transversely of the light beam, a rear transparent pressure plate movably carried by said stationary frame transversely of the light beam, said pressure plates being arranged to engage opposite sides of the film strip to hold it in the focal plane of the projector, a four-sided cam rotatably mounted on said stationary frame for reciprocating said movable frame four times for each revolution thereof, and arcuate means optionally shiftable along alternate sides of said cam so that the same reciprocates said movable frame two times for each revolution thereof.

17. A stereopticon projector comprising, in combination, a base, a lamp house carried by said base, a lens mount carried by said lamp house for rotation about the axis of the light beam of the projector; a film strip cartridge removably carried by said lens mount comprising a stationary frame, a movable frame carried and guided by said stationary frame for translatory movement along the light beam of the projector, a front transparent pressure plate carried by said stationary frame transversely of the light beam, a rear transparent pressure plate movably carried by said stationary frame transversely of the light beam, said pressure plates being arranged to engage opposite sides of the film strip to hold it in the focal plane of the projector, and means for moving said movable frame rearwardly along the light beam thereby to transitorily move said rear pressure plate rearwardly to release the film strip; and locking means carried by said lamp house and said lens mount for holding the same and said cartridge in either a vertical or a horizontal position.

References Cited in the file of this patent

UNITED STATES PATENTS

| | | |
|---|---|---|
| 1,424,457 | Fegraeus | Aug. 1, 1922 |
| 1,925,149 | McCandless | Sept. 5, 1933 |
| 2,231,765 | Landrock | Feb. 11, 1941 |
| 2,243,160 | Koehl | May 27, 1941 |
| 2,252,513 | Koehl | Aug. 12, 1941 |
| 2,301,415 | Koehl | Nov. 10, 1942 |
| 2,330,709 | Harper et al. | Sept. 28, 1943 |
| 2,553,075 | Bradford | May 15, 1951 |